United States Patent
Shen

(10) Patent No.: US 8,024,840 B2
(45) Date of Patent: Sep. 27, 2011

(54) HINGE

(75) Inventor: Wen-Bin Shen, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 309 days.

(21) Appl. No.: 12/334,545

(22) Filed: Dec. 15, 2008

(65) Prior Publication Data

US 2010/0125977 A1 May 27, 2010

(30) Foreign Application Priority Data

Nov. 21, 2008 (CN) .......................... 2008 1 0305687

(51) Int. Cl.
*E05D 11/10* (2006.01)

(52) U.S. Cl. ............... 16/330; 16/303; 16/342

(58) Field of Classification Search ............ 16/303, 16/330, 334, 342, 374, 297, 331, 332; 379/433.13; 455/575.3; 361/679.27

See application file for complete search history.

(56) References Cited

U.S. PATENT DOCUMENTS

| 5,632,066 | A  * | 5/1997 | Huong ............................. | 16/338 |
| 6,983,514 | B2 * | 1/2006 | Lu et al. .......................... | 16/342 |
| 7,203,995 | B2 * | 4/2007 | Hsu et al. ........................ | 16/330 |
| 7,581,290 | B2 * | 9/2009 | Chang ............................. | 16/340 |
| 7,676,889 | B2 * | 3/2010 | Kim ................................ | 16/330 |
| 2006/0101618 | A1 * | 5/2006 | Minami et al. ................. | 16/303 |
| 2006/0112517 | A1 * | 6/2006 | Luo et al. ........................ | 16/330 |
| 2006/0207061 | A1 * | 9/2006 | Lu et al. .......................... | 16/330 |
| 2007/0039134 | A1 * | 2/2007 | Lu et al. .......................... | 16/330 |
| 2009/0100641 | A1 * | 4/2009 | Yang .............................. | 16/303 |
| 2009/0158556 | A1 * | 6/2009 | Chang et al. ................... | 16/330 |
| 2010/0162526 | A1 * | 7/2010 | Duan et al. ..................... | 16/303 |

* cited by examiner

*Primary Examiner* — William L. Miller
(74) *Attorney, Agent, or Firm* — Altis Law Group, Inc.

(57) ABSTRACT

A hinge includes a bracket, a shaft, and a first interfering member. The shaft includes a post, and a stopper protruded thereon. The post is secured to the first interfering member. The bracket defines a pivoting hole. The bracket includes a restricting block, and a second interfering member located in the pivoting hole of the bracket opposite to the restricting block. The first interfering member together with the post rotates in the pivoting hole until the restricting block resists against the stopper of the shaft to limit a rotational range of the post. The second interfering member engages with the first interfering member to improve the rotation of the post in the pivoting hole of the bracket.

9 Claims, 5 Drawing Sheets

HINGE

BACKGROUND

1. Technical Field

The disclosure relates to mechanical structures, and particularly to a hinge.

2. Description of Related Art

A collapsible device, such as a notebook computer or a clamshell mobile phone, generally includes two parts pivotally connected to each other via a hinge. The hinge generally includes a bracket mounted to one part and a shaft with one end mounted to the other part. The bracket includes a barrel rotatably receiving an opposite end of the shaft.

For protecting the collapsible device from damage caused by excessive rotation of the hinge, the hinge is usually equipped with two stop pieces to limit a rotating angle of the hinge. Each of the stop pieces includes a stop block. The stop pieces are retained around the shaft, and are capable of rotating about each other. One of the stop blocks is capable of being blocked by the other stop block to limit the rotating angle between the stop pieces. However, the two stop pieces usually have a complicated construction, and mounting the stop pieces to the shaft is troublesome.

Therefore, the present disclosure provides a hinge to obviate the described limitations.

DETAILED DESCRIPTION

Figure 1:
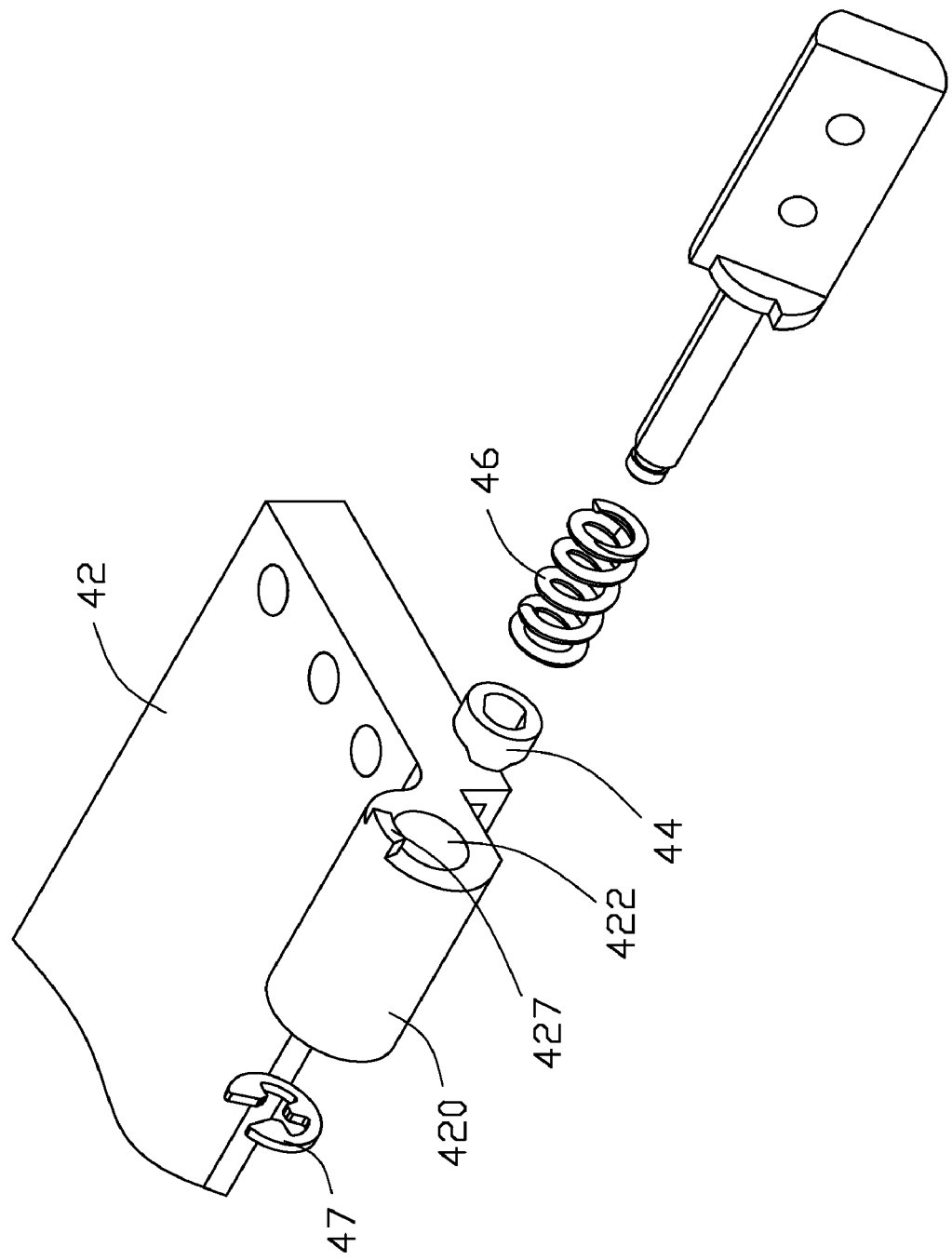
FIGS. 1 and 2 are exploded, isometric views of an exemplary embodiment of a hinge, but viewed from two different perspectives, the hinge including a bracket and a first interfering member.
Figure 2:
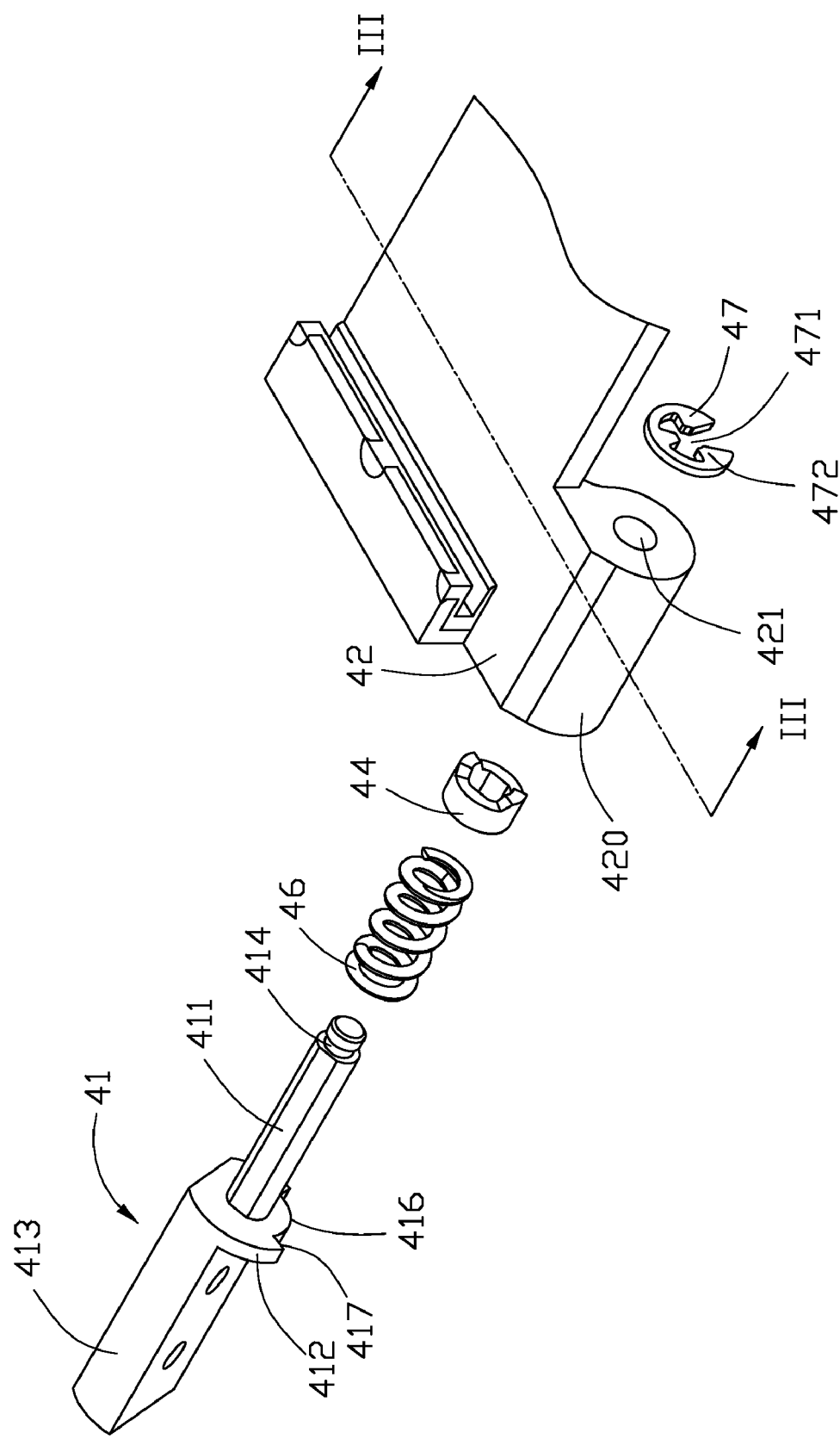

Referring to FIGS. 1 and 2, an exemplary embodiment of a hinge is adapted to be mounted to a collapsible device, such as a notebook or a clamshell mobile phone, includes two parts rotatably connected to each other via the hinge. The hinge includes a shaft 41, a bracket 42, a first interfering member 44, a resilient member 46, and a fastener 47.

The shaft 41 includes a generally flat connecting portion 413, a post 411, and a stopper 412 formed between the connecting portion 413 and the post 411. The post 411 has a noncircular, such as double-D shaped, cross section. The stopper 412 has a diameter greater than the post 411. The stopper 412 defines a cutout 416 along a circumference of the stopper 412. Two stopping end walls 417 are formed at two opposite ends of the cutout 416. The distal end of the post 411 opposite to the stopper 412 defines an annular fixing groove 414.

Figure 4:
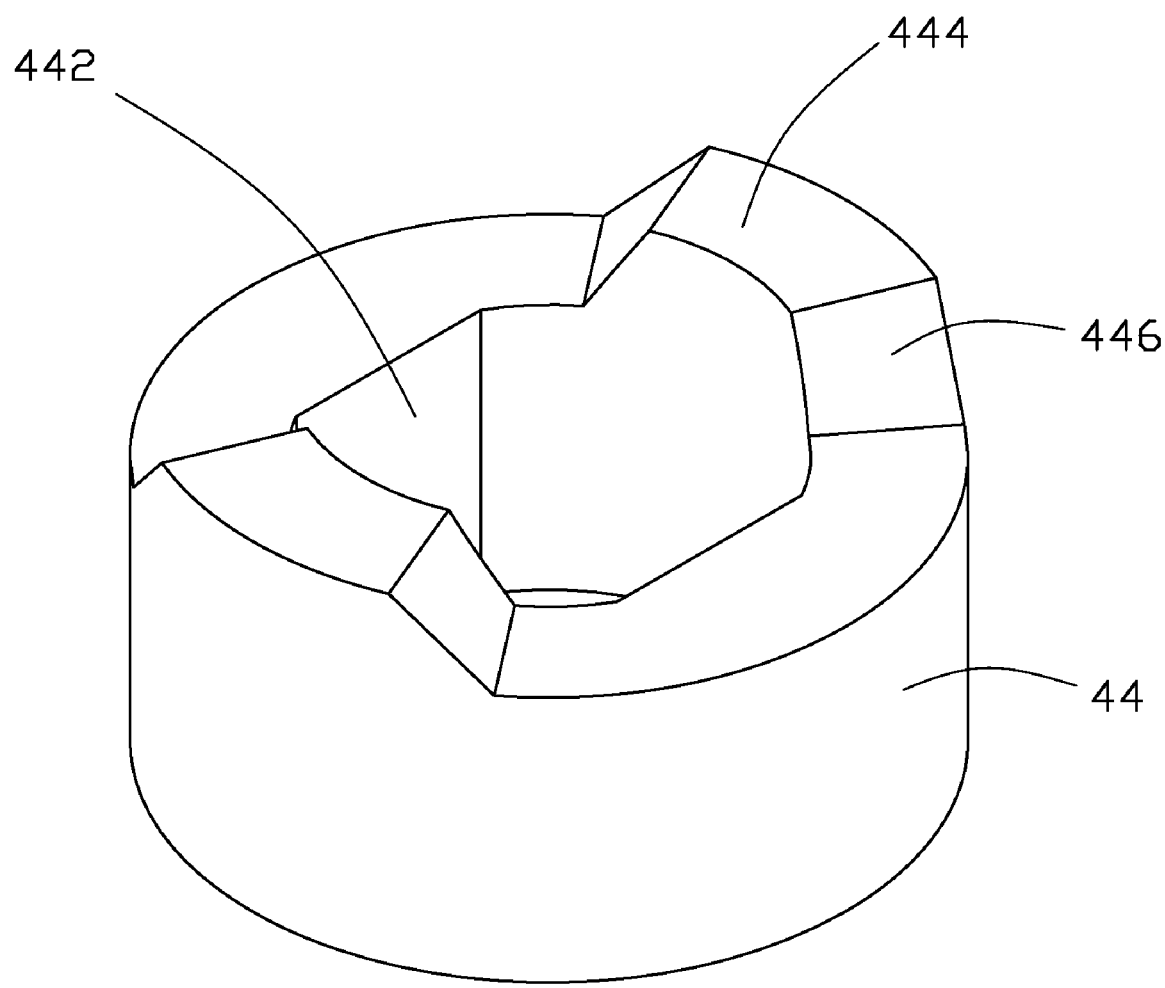
FIG. 4 is an enlarged view of the first interfering member of the hinge of FIG. 1, but viewed from another perspective.
Figure 5:
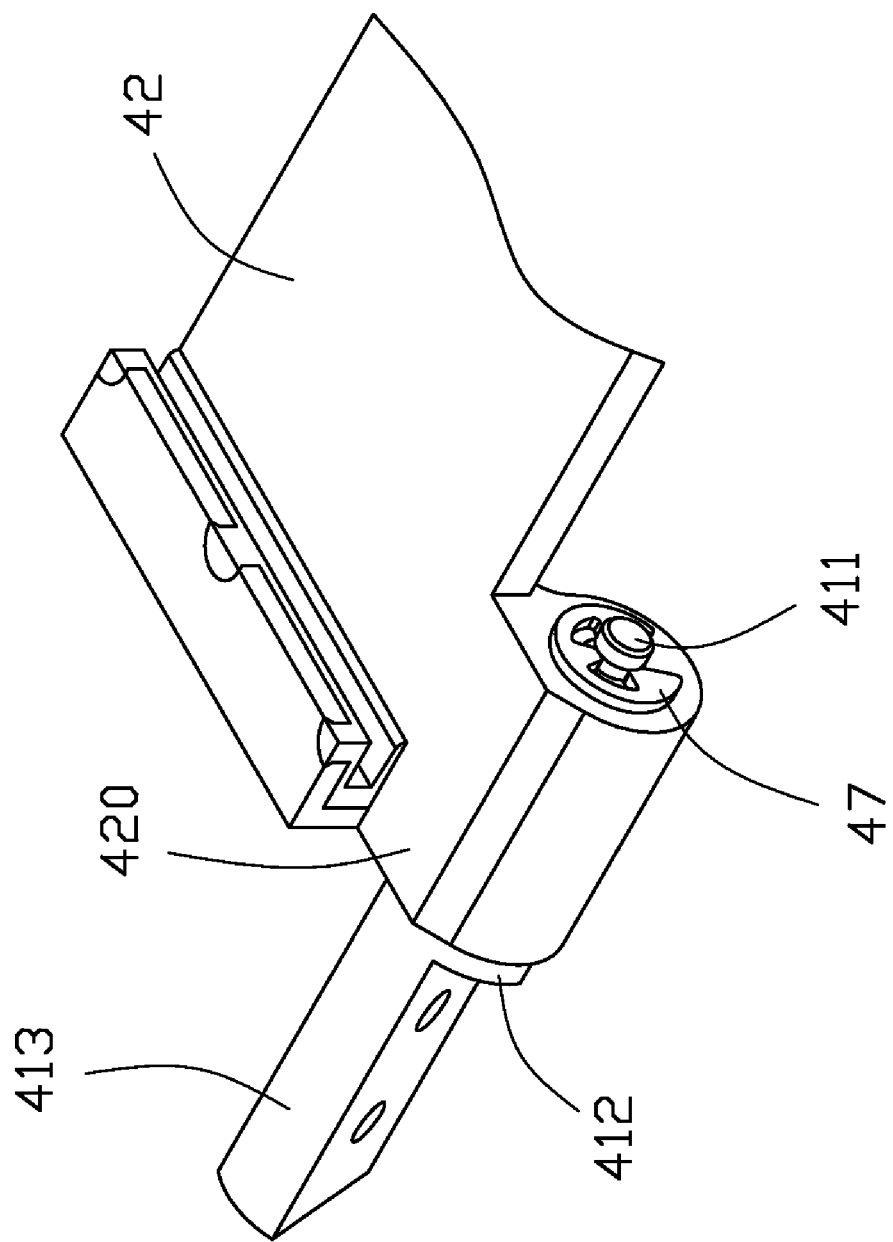
FIG. 5 is an assembled, isometric view of the hinge of FIG. 3.

Referring to FIG. 4, the first interfering member 44 defines a noncircular through hole 442, such as a through hole having a double-D shaped crossed section, corresponding to the post 411 of the shaft 41, configured to snugly fit about the post 411. A side of the first interfering member 40 forms two spaced engaging portions 444, such as protrusions in the instant embodiment. Each of the engaging portions 444 includes two slanting walls 446 at opposite ends to contact the side of the first interfering member 44.

Figure 3:
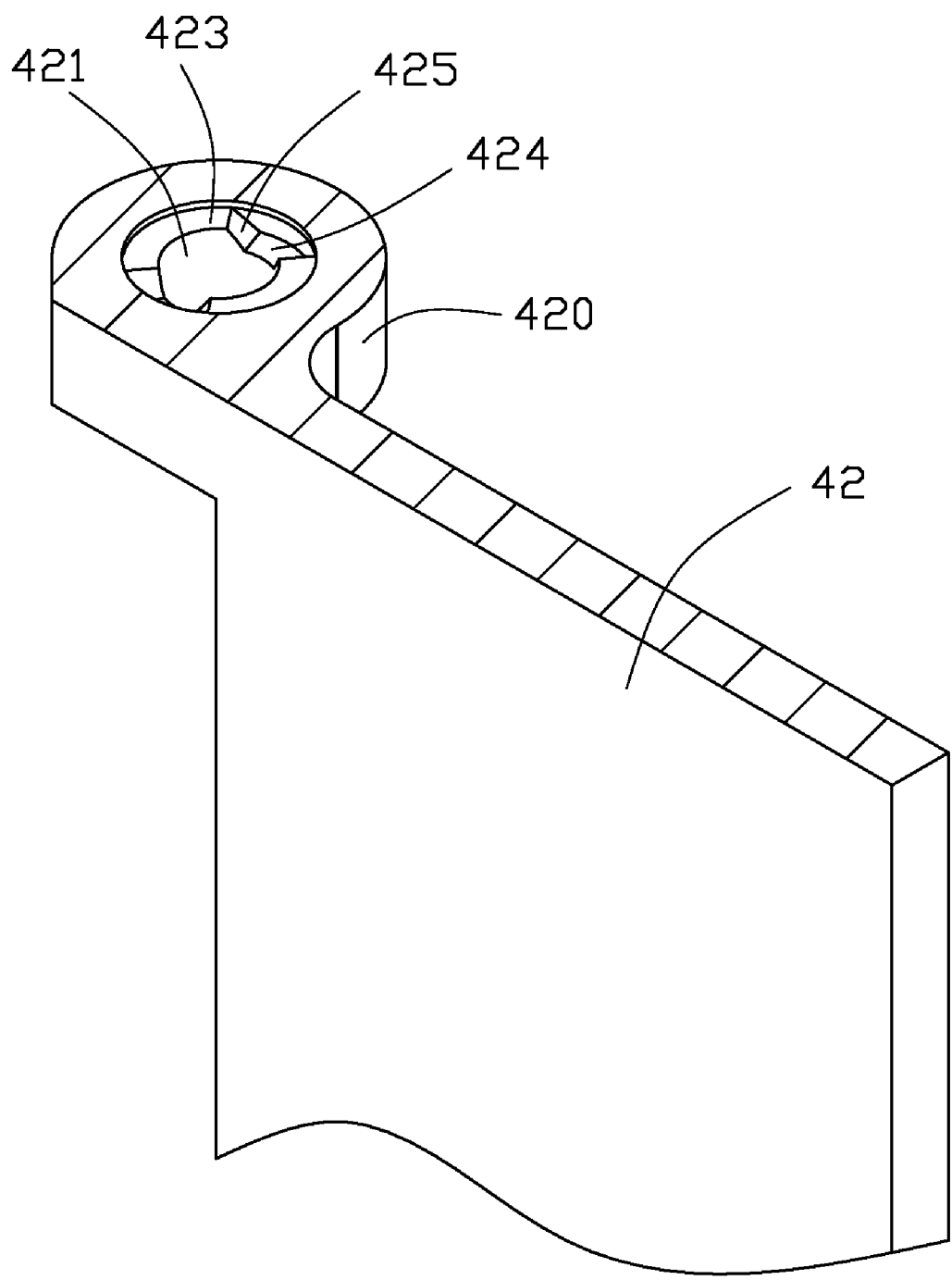
FIG. 3 is an enlarged view of the bracket of the hinge of FIG. 1, parts of the bracket cut away to show a second interfering member of the hinge.

Referring to FIGS. 1 and 3, the bracket 42 includes a cylindrical-shaped main body 420. The main body 420 includes a first end wall, a second end wall opposite to the first end wall, and a second interfering member 423. A pivoting hole 422 is axially defined in the main body 420, extending through the first end wall of the main body 420 toward the second end wall. The second interfering member 423 is formed at an inner surface of the second end wall, facing the pivoting hole 422. A through hole 421 is defined in the second interfering member 423, coaxially communicating with the pivoting hole 422. The diameter of the pivoting hole 422 is larger than that of the through hole 421. A side facing the first interfering member 44 of the second interfering member 423 forms two spaced engagement portions 424, such as recesses in the instant embodiment. Each of the engagement portions 424 includes two slanting walls 45 at opposite ends to contact the side of the first interfering member 44. A restricting block 427 extends from the second end wall of the main body 420, corresponding to the cutout 416 of the shaft 41.

In the instant embodiment, the resilient member 46 is a coil spring, and the fastener 47 is a washer defining a cutout 471. A plurality of protrusions 472 extends from the fastener 47 to enter into the cutout 471 to engage in the fixing groove 414 of the shaft 41.

Referring to FIGS. 1 to 5, in assembly, the first interfering member 44 is inserted into the pivoting hole 422 of the bracket 42, with the engaging portions 444 capable of engaging with the engagement portions 424 of the second interfering member 423. The post 411 of the shaft 41 sequentially extends through the resilient member 46, the through hole 442 of the first interfering member 44, the through hole 421 of the second interfering member 423 to be secured to the fastener 47. The protrusions 472 of the fastener 47 engage in the groove 414 of the shaft 411. At the same time, the resilient member 46 is received in the pivoting hole 422 of the bracket 42 and is sandwiched between the first interfering member 44 and the second interfering member 423. The restricting block 427 of the bracket 42 is slidably received in the cutout 416 of the stopper 412 of the shaft 41, and is capable of being blocked between the stopping end walls 417.

In use, the post 411 of the shaft 41 together with the first interfering member 44 rotates in the pivoting hole 422 of the bracket 42. After the shaft 41 rotates an angle, the restricting block 427 of the bracket 42 resists against one of the stopping end walls 417 of the stopper 412 of the shaft 41 to limit a rotational range of the shaft 41. The engaging portions 444 of the first interfering member 44 engage with the engagement portions 424 of the second interfering member 423 to position the shaft 41 during the rotation relative to the bracket 42. The slanting walls 446, 425 can smooth the movement of the shaft 41.

While several embodiments have been disclosed, it is understood that any element disclosed in any one embodiment is easily adapted to other embodiments. It is also to be understood, however, that even though numerous characteristics and advantages of the disclosure have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A hinge, comprising:
a first interfering member;
a shaft comprising a post secured to the first interfering member, and a stopper located at one end of the post, the stopper defining a cutout in a circumference thereof;
a bracket comprising a pivoting hole, a second interfering member integrally formed in a bottom of the pivoting hole to engage with the first interfering member, and a restricting block, wherein the first interfering member together with the post is capable of rotating in the pivoting hole, and the second interfering member is capable of engaging with the first interfering member to improve the rotation of the post in the pivoting hole of the bracket;
a resilient member, wherein the resilient member is rotatably retained around the post and received in the pivoting hole of the bracket; and
a fastener, wherein the fastener is fixed to a distal end of the post to prevent the post from disengaging from the bracket;
wherein the first interfering member together with the post rotates in the pivoting hole until the restricting block resists against one of opposite ends of the cutout to limit a rotational range of the post.

2. The hinge of claim 1, wherein a cross section of the post is noncircular, and the first interfering member is retained around the post, and defines a noncircular through hole snugly fitting about the post to allow the first interfering member to rotate with the post.

3. The hinge of claim 2, wherein the fastener defines a noncircular through hole to snugly fit about the post.

4. The hinge of claim 1, wherein the first interfering member forms two spaced engaging portions, and the second interfering member forms two engagement portions capable of engaging with the engaging portions respectively.

5. A hinge, comprising:
a shaft comprising a post having a noncircular cross section and a stopper formed on the post;
a first interfering member defining a through hole to snugly fit about the post to allow the first interfering member to rotate with the post;
a bracket defining a pivoting hole for rotatably receiving the first interfering member therein, the bracket forming a restricting block to limit a rotational range of the post when the stopper resists against the restricting block, wherein the bracket comprises a second interfering member integrally formed in a bottom of the pivoting hole away from the restricting block, and the second interfering member engages with the first interfering member to improve the rotation of the post of the shaft together with the first interfering member in the pivoting hole of the bracket;
a resilient member, wherein the resilient member is rotatably retained around the post and received in the pivoting hole of the bracket; and
a fastener, wherein the fastener is fixed to a distal end of the post to prevent the post from disengaging from the bracket.

6. The hinge of claim 5, wherein the fastener defines a noncircular through hole to snugly fit about the post.

7. The hinge of claim 5, wherein the first interfering member forms two engaging portions, and the second interfering member forms two engagement portions capable of engaging with the engaging portions respectively.

8. The hinge of claim 5, wherein the second interfering member defines a round through hole, and the post is rotatably inserted through the through hole of the second interfering member.

9. The hinge of claim 5, wherein a cross section of the post is double D shaped, and the first interfering member defines a double D shaped engaging hole for receiving the post.

* * * * *